United States Patent [19]

Kesslin

[11] 4,058,409

[45] Nov. 15, 1977

[54] ANTI-TRANSPIRANT COMPOSITION

[75] Inventor: George Kesslin, Teaneck, N.J.

[73] Assignee: Kay-Fries Chemicals, Inc., Stony Point, N.Y.

[21] Appl. No.: 608,870

[22] Filed: Aug. 29, 1975

Related U.S. Application Data

[63] Continuation of Ser. No. 436,166, Jan. 24, 1974, abandoned.

[51] Int. Cl.$^2$ ............................................. C09G 1/10
[52] U.S. Cl. .................................... 106/271; 106/230; 106/270; 260/27 R
[58] Field of Search ...................... 260/28.5 A, 27 R; 106/270, 271, 230, 236, 237, 238, 239

[56] References Cited

U.S. PATENT DOCUMENTS 2,766,214  10/1956  Erchak ................................. 106/271

3,420,790  1/1969  Gassner ............................ 260/27 R

OTHER PUBLICATIONS

A. H. Warth, Chemistry and Technology of Waxes, 2nd edition, Reinhold Pub. Co., New York, 1956, pp. 499, 533, 534.

*Primary Examiner*—Paul R. Michl
*Attorney, Agent, or Firm*—Robert E. Isner

[57] ABSTRACT

A film-forming anti-transpirant concentrate for plants selectively constituted of a homogeneous intermixture of emulsifiable oxidized polyethylenes having molecular weights in the range of from about 1000 to about 3400 and selectively constituted polyterpenes having molecular weights in the range of from about 270 to about 1800 for dilutable ambient temperature controllable application to plants to form long lived protective films of determinable thickness on the surface thereof.

11 Claims, No Drawings

ANTI-TRANSPIRANT COMPOSITION

This application is a continuation of my application Ser. No. 436,166 filed Jan. 24, 1974, now abandoned.

This application relates to the formation of protective films of improved character for growing plants and particularly to an improved anti-transpirant film-forming composition for enhancing plant health and growth.

One of the major factors affecting plant growth and general health is the maintenance of certain natural relationships between the rate of moisture absorption through the plant root systems and the rate of moisture loss through the exposed portions of the plant foliage. Such moisture loss is primarily effected through the leaf portions of the plant via the stomata and the process thereof is commonly known as transpiration. When the loss of water by transpiration exceeds that being absorbed by the root system for any appreciable time, the plant becomes limp, dessiccates and eventually dies. It is therefore highly desirable to provide at least a partial barrier to transpiration in situations where the plant is unable to satisfy its normal water requirements by absorption from the soil. One such situation commonly arises in the dormant season when, for example, winter winds operate to remove moisture from the leaves of evergreens on sunny days with low relative humidity while, at the same time, the ground surrounding the plant root systems is too frozen to allow any appreciable water absorption via the roots. Another such situation commonly occurs in the transplanting of trees, shrubs and other nursery stock and particularly when such transplanting occurs during the growing season. During the course of transplantation, water loss by transpiration continues while the plant is subject to shock and the unavoidably damaged root structures effect reduced water intake from the soil for an appreciable period of time following replanting.

The desirability of employing transpiration barrier films that do not otherwise detrimentally effect plant growth and health has been long recognized and numerous expedients have been suggested for such use. Among the earlier materials employed were waxlike materials applied in molten condition. However, the high application temperatures and lack of control of film thickness with consequent flake-off and film deterioration markedly limited effective use thereof. Various types of vinyl latex compositions have also been applied to plants as protective coatings. While these materials function to reduce transpiration, they are often unstable to freezing weather which effects an irreversible precipitation of the polymer that renders it unsuitable for use. In addition and apart from a limited life due to a relatively rapid peeling and flaking with a normal consequently required multiple application thereof, such vinyl latex materials are also subject to undesirable precipitation in the spray equipment which not only causes extremely difficult clean-out problems, but can even result in actual discard of the equipment. Other film-forming materials such as polyethylene have been suggested for use both for plant foliage and as produce coatings. However, their relatively limited effective life has effectively precluded widespread usage thereof as an anti-transpirant for plant foliage. More recently, low molecular weight polyterpenes of the type described in U.S. Patent 3,676,102 have been advanced for use as anti-transpirants. Experience to date has indicated, however, that while these compositions have a desirable low toxicity to plants, they provide only limited barriers to water loss and are relatively difficult to apply and handle because of their tacky character and have not provided the long sought, highly effective, long lived and low cost anti-transpirant of minimal toxicity.

This invention may be briefly described as an improved highly dilutable film-forming anti-transpirant composition of markedly low toxicity and extended effective life and which includes, in its broadest aspects, a homogeneous intermixture of oxidized polyethylenes and polyterpenes of selective molecular weight ranges. In its narrower aspects, the subject invention includes the utilization of selectively constituted emulsifiable polyethylenes having molecular weights in the range of about 1000 to about 3400 and polyterpenes having molecular weights from about 270 to about 1800 and desirably in association with minimal amounts of emulsifying agents and modifiers where the same are formulated as an aqueous emulsion concentrate.

Among the advantages of the subject invention is the provision of highly dilutable film-forming anti-transpirant concentrates of low toxicity available as aqueous emulsions or dissolved in organic solvents for ambient temperature application to plant foliage or to produce by spraying, dipping or brushing to form continuous films of extended operational life with effective anti-transpirant properties. A further advantage of the subject invention is the provision of film-forming non phytotoxic concentrates having highly effective anti-transpirant properties and a selectively controllable duration of operating life, degree of tack and other properties.

It is an object of this invention to provide an improved anti-transpirant composition for highly diluted application to plant foliage or vegetable produce. Other objects and advantages will become apparent from the following portions of this disclosure which describe the principles of this invention and the presently preferred embodiment incorporating such principles.

The improved film-forming anti-transpirant concentrate formulated in accord with the principles of this invention comprises a polyethylene constituent and a polyterpene constituent with each of said constituents being of predetermined character and of a molecular weight falling within selective ranges thereof. Efficacious film-forming concentrates may include from about 9 parts of polyethylene constituent to each part of polyterpene constituent to about 1 part of polyethylene constituent to about 20 parts of polyterpene constituent, desirably from about 3 parts of the polyethylene constituent to each part of polyterpene constituent to about 1 part of polyethylene constituent to about 20 parts of polyterpene constituent. The presently preferred range of constituents and which generally exhibit markedly improved properties comprise from about equal parts of polyethylene and polyterpene constituents to about 1 part of polyethylene constituent to about 20 parts of polyterpene constituent.

The polyethylenes employed in this invention constitute oxidized emulsifiable polyethylenes of the type derivable from the partial oxidation of polyethylene having molecular weights of from about 1000 to about 3400, and preferably from about 1400 to about 2100. The oxidized emulsifiable polyethylenes obtained therefrom have substantially similar molecular weights, and are characterized by softening points of from about 95° C to about 115° C, preferably from about 100° C to about 107° C, densities ranging from approximately 0.92 to 0.96 and acid numbers of from about 14 to about 16. Presently preferred emulsifiable oxidized polyethylenes, suitably comprise Allied Corporation's polyethylenes AC 629, AC 655, AC 656, AC 680 and AC 690 and Eastman Chemical Products, Inc.'s EPOLENE E-10, E-12, E-14, E-15 and E45.

The polyterpenes utilizable in the practice of this invention are derivable from the polymerization of naturally occurring or synthesized monomeric terpenes or mixtures thereof, for example, alpha-pinene, beta-pinene, di-pentene, terpinene, terpinolene, and various turpentines such as sulfate, wood and gum. Suitable polyterpenes may be obtained by the method disclosed by Roberts and Day, J.Am.Chem.Soc. 72, 1226 (1950). The presently preferred polyterpenes comprise polyterpene material commercially available from Arizona Chemical Co. as Terpene Dimer 95.

ZONAREZ B-10, B-25, B-40, B-55, B-70, B-85, B-100, B-115, B-125 and B-135. Such usable and presently preferred polyterpenes have molecular weights from about 270 to about 1800, and range in physical character from liquid at ambient room temperatures and below at the lower end of the molecular weight range, to solid at the higher molecular weights. Such solid polyterpenes have softening points up to about 135° C, and approximately zero acid number. The polyterpenes that are preferred for use have a molecular weight range of about 600 to about 800.

It should be particularly noted that neither the modified polyethylenes nor the polyterpenes employed in this invention are particularly efficacious for use as plant anti-transpirants by themselves. Thus, while modified polyethylenes alone can be emulsified in water and applied to plants to give a relatively non-phytotoxic film with water barrier properties, such film will usually peel away from plant leaves within a few weeks of application upon outdoor exposure. Likewise, while polyterpenes at the lower end of the molecular weight range, for example, from about 270 to about 550, form longer lasting non-phytotoxic films that are relatively water permeable, while the higher molecular weight polyterpenes, i.e. at about 1800, are difficult to emulsify and do not form continuous, long lasting films.

In contradistinction therewith polyethylene-polyterpene intermixtures formulated in accord with the principles of this invention comprise film-forming compositions of long lived nonphytotoxic character having unexpected and surprising water barrier properties. Experience to date has unexpectedly indicated that the herein described intermixture of the oxidized emulsifiable polyethylenes and polyterpenes of the type described generally preserve, if not enhance, the efficacious features of the individual constituents while negating, if not eliminating, the deleterious features thereof. In fact, and as will hereinafter appear, the combination of constituents often results in surprising and totally unexpected enhancement of desirable properties.

The above described polyethylene-polyterpene intermixtures concentrate, formulated in accord with the principles of this invention, may be prepared in various forms. For example, the polyethylene constituent may be dissolved in the polyterpene constituent and, depending upon the melting points of the particular constituents employed, may be shipped either as a solid or a liquid with ultimate conversion at the point of usage to a suitable form that is readily applicable to plant foliage or the like. Alternatively, both the polyethylene and polyterpene constituents may be dissolved in an organic solvent to form a readily transportable concentrate thereof. The basic polyethylene and polyterpene constituents are readily soluble in a number of hydrocarbon and chlorinated solvents including such diverse solvents as toluene, xylene, mineral spirits, mineral oil, kerosene, superior oil, methylene chloride, ethylene dichloride, trichloroethane, chlorobenzene, and like solvents. The concentrations of the polyterpenepolyethylene constituent intermixture may vary widely when mixed with these solvents both for transport and for application depending on the use for which the composition is intended.

While such polyethylene-polyterpene intermixtures can be effectively utilized in either of the above two described forms, the presently preferred form for general utilization thereof is as an aqueous emulsion. When water is employed as the liquid vehicle for the polyethylene-polyterpene intermixture, emulsification is facilitated with the addition of emulsifiers to the basic constituents. Such emulsifiers can be any one of a number of known emulsifiers of either the anionic, nonionic or cationic types. Aqueous emulsion concentrates embodying the principles of this invention will generally comprise from about 0.5% to about 2.5% by weight of such emulsifying agents and may comprise up to 40% or more, by weight, of the primary polyethylene and polyterpene film-forming constituents, based on the total weight of the entire composition.

Among anionic emulsifiers usable herein are the salts of oleic acid, Tall Oil acid, dodecyl benzenesulfonic acid, saturated fatty acids having about 12–18 carbon atoms and salts of sulfonates of saturated fatty alcohols having about 12–18 carbon atoms. Suitable salts can be formed with alkali metals and with amines such as ammonia, morpholine, monoethanolamine, diethanolamine, triethanolamine, 2-amino-2-methyl-1-propanol, 2-dimethylamino-2-methyl-1-propanol and 3-methoxypropylamine.

Among nonionic emulsifiers usable herein are p-octylphenoxypolyethoxyethanols, p-nonylphenoxypolyethoxyethanols, ethoxylated fatty alcohols of about 12–18 carbon atoms, polyethoxyethanol, sorbitol and glycerol esters of fatty acids with about 12–18 carbon atoms.

The presently preferred cationic emulsifiers comprise aliphatic amine acetates.

Emulsifying agents of the type noted above are normally undesirably characterized by a relatively high degree of toxicity to plant foliage or the like. In order to minimize the quantities of such emulsifying agents incorporated in the polyethylene-polyterpene intermixture, a small amount of a modifying agent is desirably incorporated therein. Such modifying agent, which suitably comprises a small amount of a base, such as potassium hydroxide dissolved in ethylene glycol, functions as acidity modifier to improve the emulsifiability of the oxidized emulsifiable polyethylene constituent and to thus reduce the amount of emulsifying agent employed.

Among the manifold advantages of the subject composition is its ready formulation as a concentrate for economy in formation, packaging and transport to the locus of use thereof. While, as previously indicated the concentrate may be usable in certain instances in undiluted form, it will normally be applied in a highly diluted condition having, for use on living plant foliage, an ultimate active polyethylene-polyterpene constituent concentrations of from about 4% to about 10% by weight. Such highly diluted mixtures will generally be applied to foliage in the aqueous emulsion form or in solution with a suitable organic solvent. While such diluted mixture will be generally applied by spraying, it may also be applied by dipping or brushing. Each of such mode of application forms, upon evaporation of the liquid vehicle carrier, an essentially continuous film having highly effective and long lived anti-transpirant properties with minimal phytotoxic effects.

Illustrative examples of improved anti-transpirant compositions incorporating the principles of this invention are as follows:

EXAMPLE 1

Twenty grams of Zonarez B-135 polyterpene (softening point 135° C, molecular weight about 1300); 20 grams of AC 629 polyethylene (molecular weight of about 1800); 3.5 grams of Oleic Acid; 2 grams of morpholine and 2 grams of Tween 80 (ICI) are intermixed and heated to 120° C to obtain a homogeneous oily solution thereof. To such heated solution, 0.43 grams of potassium hydroxide dissolved in 0.85 grams of ethylene glycol is added and stirred until uniform.

75 ml. of water is preheated in a beaker to 95° C. The heated water is then stirred and the above described mixture is then gradually added to the vortex thereof. A milky, opalescent, stable and essentially anionic emulsion is thus formed, after which the formed emulsion is cooled to room temperature with continued stirring.

Such emulsion contains approximately 40% solids as determined by evaporation of a sample at room temperature.

EXAMPLE 2

Ten grams of Zonarez B-25 polyterpene (softening point 25° C, molecular weight about 700); 30 grams of modified polyethylene AC 629 (molecular weight about 1800); 5 grams of nonylphenol ethoxylate (Tergitol-NFX, Union Carbide) and 2 grams of polyoxyethylene sorbitan oleate (Tween 80, ICI) are intermixed and heated to 110°-120° C to obtain a homogeneous oily solution thereof. To this solution, 0.85 grams of potassium hydroxide dissolved in 1.7 grams of ethylene glycol is added and stirred until uniform. 85 ml. of water is preheated to 95° C, stirred and the hot oil solution gradually added to the vortex thereof. The emulsion is cooled to room temperature with stirring to form a milky, opalescent, stable nonionic emulsion.

Meaningful quantitative comparative results on moisture vapor transmission rates of film-forming materials intended for anti-transpirant use on plants are not readily obtainable by using plants as test specimens, since normal variation in plant size and health make the validity of any conclusions drawn therefrom uncertain. Plant leaf surfaces also normally vary in their normal "waxiness," depending on the species and the age of the leaf, thus making it difficult, if not impossible, to accurately determine the relative effects of a given anti-transpirant composition. Furthermore, one is never quite sure that the foliage of any particular plant has been given a uniformly distributed film coating, much less a coating of known thickness, regardless of application techniques.

In order to obtain comparative moisture vapor transmission rate data (hereinafter termed MVTR) that is quantitive and unambiguous, films of known thicknesses were formed on a uniform, high quality bond paper (20 lb., 25% cotton fiber content) and the respective MVTR values determined by a modification of test procedure ASTM-E 96, Procedure B.

The apparatus employed consisted of 12 ounce mason jars, a 9 liter desiccator with 200 grams of silica gel as a dry chamber, and an analytical balance. The mason jars were filled with 10 ml. of distilled water to cover the bottom thereof and capped with a metal lid having a removable circular center section of approximately 25 sq. cm. The center section was removed and replaced by a coated paper specimen in the form of a circular disc having a diameter of 6.8 cm. so as to fit snugly into the metal lid.

The film was deposited on the circular bond paper by dipping it into an aqueous emulsion containing approximately 15% by weight of the film-forming ingredients. For those formulations where emulsions were inconvenient to prepare, 15% by weight solutions in xylene were used instead. The film was allowed to dry in ambient air at room temperature for at least 24 hours. The film thickness was determined by weighing the paper specimen prior to dipping and after the dipped specimen was dried. From the known respective densities of the coating materials and the area of film deposition, the film thickness was calculated.

The total weight of the mason jar, metal lid, coated paper and 10 ml. of water was obtained by weighing the same on an analytical balance to the nearest milligram. The assembled test jar was then placed in the dry chamber and weighed periodically to determine the loss of moisture vapor through the coated paper disc.

The figures obtained from the foregoing weighings provide the basic data required to calculate the moisture vapor transmission rate (MVTR) in gram mils per 24 hours per 100 sq. in. More specifically, the MVTR was calculated for each specimen with and without the film applied to the paper disc. The respective reciprocal MVTR for each specimen was calculated to give the impedance value (which is an additive function), and the difference then taken to obtain the experimental impedance of the film itself (and ultimately the MVTR thereof) as shown in the following Tables I, II and III. The data presented in these tables is the result of tests based on the average water loss per hour from 2 successive weighings at 2 hour intervals. 24 hour weighing intervals gave similar permeability results. All data represents the average of at least two, and generally more, determinations on the same or separately prepared coated paper discs.

The following Table I represents measurements of the type described above selectively made upon various specimens of primary constituents includable in the intermixtures thereof formulated in accord with the principles of this invention.

TABLE 1

| Sample No. | Film Coating Material | Exptl.(1) Permeability (MVTR) | Exptl.(2) Impedance /mil |
|---|---|---|---|
| 1 | Oxidized Polyethylene AC 629 (MW - 1800) | 8.9 | 0.1130 |
| 2 | Liquid Polyterpene - Terpene Dimer 95 (MW - 272) | 98 | .0102 |
| 3 | Polyterpene - Zonarez B-10 (softening pt., 10° C; MW - 700) | 25.4 | .0394 |
| 4 | Polyterpene - Zonarez B-25 (softening pt., 25° C) | 36.6 | .0273 |
| 5 | Polyterpene - Zo- | 70 | .0143 |

TABLE 1-continued

| Sample No. | Film Coating Material | Exptl.(1) Permeability (MVTR) | Exptl.(2) Impedance /mil |
|---|---|---|---|
| | narez B-85 (softening pt., 85° C) | | |
| 6 | Polyterpene - Zonarez B-135 (softening pt., 135° C; MW - 1800) | 61 | .0165 |

(1) Moisture Vapor Transmission Rate given in gram mils per 24 hours per 100 sq. in. and determined at approximately 0.5. mil film thickness
(2) Reciprocal of permeability As evidenced by the above, polyterpenes alone have comparatively limited water barrier properties. In contradistinction therewith polyethylene provides far more effective water barrier properties but experience has indicated only limited effective life and other undesirable characteristics that preclude use on a commercial scale.

Illustrative films of polyterpene and oxidized emulsifiable polyethylene mixtures formulated in accord with the principles of this invention were made up as shown in Examples 7 to 15 in the following Table II. In addition to the experimental MVTR and impedance values determined for each of the polyterpene and modified polyethylene films, a theoretical impedance contribution from each active component (that is, the respective polyterpene and modified polyethylene impedance) was calculated in proportion to its concentration in the film coating. A theoretical MVTR and impedance value were then determined for each of Examples 7 to 15 as shown in columns 3 and 4 of Table II.

TABLE II

| Sample No. | Film Coating Material | Exptl.(1) Permeability (MVTR) | Exptl.(2) Impedance /mil. | Theor.(3) Impedance /mil. | Theor.(4) Permeability |
|---|---|---|---|---|---|
| 7 | Zonarez B-10/ AC 629 (1/1) | 7.2 | 0.1395 | .0762 | 13.1 |
| 8 | Zonarez B-25/ AC 629 (1/1) | 7.9 | 0.1275 | .0702 | 14.2 |
| 9 | Zonarez B-85/ AC 629 (1/1) | 9.2 | 0.1087 | .0637 | 15.7 |
| 10 | Zonarez B-85/ AC 629 (3/) | 10.5 | 0.0955 | .0391 | 25.6 |
| 11 | Terpene Dimer 95/Zonarez B-10 /AC 629 (10/10/1) | 25.5 | 0.0393 | .0285 | 35 |
| 12 | Terpene Dimer 95/Zonarez B-10/AC 629 (15/5/2) | 27.1 | 0.0369 | .0259 | 38.6 |
| 13 | Terpene Dimer 95/ Zonarez B-10/AC 629 (20/5/1) | 35.9 | 0.0279 | .0196 | 51 |
| 14 | Zonarez B-10/ AC 629 (1/9) | 13. | 0.0770 | .1057 | 9.5 |
| 15 | Zonarez B-135/ AC 629 (1/1) | 28.9 | 0.0346 | .0648 | 15.4 |

(3) Theoretical impedance based upon as calculated from impedance contribution from each active constituent in proportion to its concentration in the film coating
(4) Reciprocal of theoretical impedance As further evidenced by the foregoing, intermixtures formulated in accordance with the principles of this invention provide, insofar as water barrier properties are concerned and as shown by a comparison of the experimentally measured permeability values with the calculated theoretical values thereof, a surprising and synergistic type effect over a wide range of proportions thereof extending from about equal amounts of oxidized polyethylene and polyterpene to intermixtures having only a relatively small amount of polyethylene in comparison to the amount of polyterpene present. Evidence available to date indicates that such a synergistic type effect will also be obtained from intermixtures made up of greater amounts of polyethylene than polyterpene and probably extending to intermixtures where as much as about three parts of polyethylene to each part of polyterpene. Such synergistic effect is apparently not obtained for intermixtures predominantly made up of polyethylene but even here improved films of extended operating life that are effectively free of the disadvantages of polyethylene usage alone appear to result.

In addition to the foregoing, similar measurements were made on several available commercial products that exhibit film-forming properties such as Vapor Gard, as manufactured and sold by Miller Chemical & Fertilizer Corp.; Plant Gard, as manufactured and sold by Polymetrics International Inc., and Wilt-Pruf-NCF, as manufactured and sold by Nursery Specialty Products. In conjunction with this later measurement, which employed Wilt-Pruf applied at the manufacturers recommended dilution of 1 part of concentrate to 5 parts of water, a special measurement of a 40% aqueous emulsion of equal parts of Zonarez B-10 and AC 629 appled at about a 1 to 4 l dilution in water was effected. Under such conditions, the film thickness was approximately 0.2 mil. for each. The results of such measurements are set forth in Table III below.

TABLE III

| Sample No. | Film Coating Material | Exptl. Permeability (MVTR) | Exptl. Impedance /mil. |
|---|---|---|---|
| 16 | d-Menthene Dimer (Vapor Gard) | 31 | .0320 |
| 17 | Plant Gard | 167 | .0060 |
| 18 | Wilt-Pruf-NCF | 45 | .0222 |
| 19 | Zonarez B-10/AC 629 (1/1) | 14 | .0713 |

A comparison of Vapor Gard (d-menthene dimer) permeability with that of Sample 7 (Table II) shows than an improved anti-transpirant composition formulated in accord with the principles of this invention possesses about 4.4 times greater water barrier properties. Such efficacy is further demonstrated by the 3.2 times greater impedance value for Sample 19 than Sample 18, Wilt-Pruf-NCF, with both samples prepared at recommended concentrations for winter use.

Anti-transpirant film-forming concentrates formulated in accord with the principles of the present invention may also be advantageously used in conjunction with seedling evergreen nursery stock that is frequently shipped in bareroot condition and by air to reduce the time between removal of the seedlings from the soil and their subsequent planting. It is generally necessary to plant the seedling on the day of arrival at the planting site or suffer extensive losses.

A study was conducted using groups of at least five 3-year seedlings of Austrian Pine, five 3-year seedlings of Scotch Pine and five 3-year seedlings of Colorado Blue Spruce which were air-freighted to the planting site. The seedlings were immediately soaked in water for 2 hours, followed by dipping in an aqueous emulsion containing 3.7% by weight of a 1:1 mixture of oxidized polyethylene and polyterpene formulated in accord with the disclosure herein. The so treated seedling stock were then exposed to atmosphere before planting for a period of 1 and 3 days. For each species and for each period of exposure, a control group of five untreated seedlings was planted nearby. Ratings of damage were made on a scale of 1 to 5, in which 1 represented a plant with no damage and 5 represented a dead plant. Ratings of 2,3 and 4 represented increasing damage as measured by progressive browning from the tips of the branches back to the main stem. The time between planting and evaluation was 3 months (April to July). A summary of these results is presented in Table IV.

TABLE IV

Evaluation of Damage from Delayed Planting of Seedling Stock

| Seedling Species | | Planting delay after dipping | |
|---|---|---|---|
| | | 1 day | 3 day |
| 1. Austrian Pine - | treated | 3 | 3.8 |
| | untreated | 4 | 4.4 |
| 2. Scotch Pine - | treated | 2 | 4.2 |
| | untreated | 2.6 | 5 |
| 3. Colorado Blue Spruce - | treated | 2.8 | 4.8 |
| | untreated | 5 | 4.8 |

From Table IV, it can be seen that the damage to the seedlings was considerably reduced after a 1 day exposure of the bare-root seedling to the atmosphere after dipping. Three day exposure to the atmosphere, after dipping, further increased damage and seedling mortality, but dipped seedlings of Austrian Pine and Scotch Pine still showed noticeably less damage than undipped seedlings.

As evidence of the increased operational life of anti-transpirant films obtainable by the practice of the subject invention, ten mature evergreens (*Taxus densiformis*) were planted in the fall at an exposed windy location near the widest portion of the Hudson River at Bowline Point, Haverstraw, New York. These plants were thoroughly sprayed in early December with an aqueous emulsion containing about 10% by weight of a 1:1 mixture of oxidized polyethylene AC 629 and Zonarez B-10 polyterpene and were inspected in late January and again in March of the following year. It was found that essentially no browning or damage had occurred to the foliage of the sprayed plants. In comparison therewith, other evergreens in the surrounding area were observed to have noticeable browning of the latest growth making them less attractive in appearance. The appearance of the plants sprayed only once with the described polyethylene-polyterpene emulsion was equal or superior to that of the evergreens that had been sprayed twice with a commercial product (Wilt-Pruf-NCF) in early December and in late January.

Professional nurserymen at least in the North Atlantic States generally do not recommend transplanting deciduous or evergreen shrubs during the summer months and especially during July and August. During this time of year, and under the ambient conditions usually extant thereat, normal transpiration of water by the growing plant in full leaf requires a healthy root structure and adequate absorption of water from the soil. Transplanting during this period inevitably damages the roots, induces plant shock and reduces the capacity of the roots for water absorption. In order to demonstrate the efficacy of the compositions of this invention, 18 different varieties of 3 to 5 year old deciduous and evergreen shrubs were obtained bare-root from a nursery. Immediately after receipt, each shrub was soaked 2 hours in water, cut back in growth approximately one third, and dipped in varying strength aqueous emulsions of a 1:1 mixture of polyterpene (Zonarez B-10) and oxidized emulsifiable polyethylene (AC 629). More specifically, five plants of each species were treated with Composition A — a 3.3% strength emulsion, containing 3.7% solids; five plants of each species with Composition B — a 2.2% strength emulsion containing 2.5% solids and five plants of each species were left untreated. All shrubs were then transplanted in the New York City area in late July. The health of the plants was evaluated in late September again using an arbitrary rating system of 1 to 5, where 1 equals no leaf drop and plant is in excellent condition; 2 equals light leaf drop with light leaf scorch; 3 equals heavy leaf drop with active leaf growth this season; 4 equals heavy leaf drop with buds set for next season; and 5 equals dead. Each of the five plants was rated individually and the average numerical rating tabulated in Table V. The FIGURE in parenthesis next to the rating represents the percentage of improved health as compared to the untreated shrubs.

TABLE V

Evaluation of Damage Resulting from Summer Transplanting

| Plant Species | Composition A | Composition B | Untreated Shrubs |
|---|---|---|---|
| Honeysuckle (*Lonicera tartarian*) | 2.8 (12.5%) | 2 (38%) | 3.2 |
| Weigela (*Weigela rosea*) | 2.6 (13.4) | 2 (26.7) | 3 |
| Pepper Bush (*Clethra alnifolia*) | 4.2 (4.6) | 3.4 (4.6) | 4.4 |
| Mock Orange (*Philadelphus virginalia*) | 3.2 | 2.8 (6) | 3 |
| Privet (*Ligustrum regelianum*) | 1.6 (20) | 2 | 2 |
| Privet (*Ligustrum ovalifolium*) | 2.2 | 1.4 (30) | 2 |
| Forsythia (*Forsythia suspensa*) | 2 (48) | 1.6 (54) | 3.6 |
| Chokeberry (*Aronia arbutifolia*) | 2.2 (27) | 2 (33) | 3 |
| Arrow-wood (*Viburnum dentatum*) | 2 (21) | 2.6 (31) | 3.8 |
| Lilac (*Syringa chinensis*) | 3.2 (16) | 3 (21) | 3.8 |
| Lilac (*Syringa vulgaris*) | 1.8 (25) | 2.4 | 2.4 |
| Snowberry (*Symphoricarpos racemosa*) | 3.6 (25) | 4.6 (4) | 4.8 |
| Spirea (*Spirea Anthony Waterer*) | 1.2 (14) | 1.4 | 1.4 |
| Spirea (*Spirea Van Houttei*) | 1.6 | 1 (28%) | 1.4 |
| Cranberry (*Viburnum opulus*) | 2 (33) | 3 | 3 |
| Buckthorn (*Rhamnus tallhedge*) | 2 (29) | 2 (29) | 2.8 |
| Euonymus (*Euonymus* | 2.4 (20) | 1.2 (60) | 3 |

TABLE V-continued

Evaluation of Damage Resulting from Summer Transplanting

| Plant Species | Composition A | Composition B | Untreated Shrubs |
|---|---|---|---|
| Euonymus (*Euonymus alatus* alatus compactus) | 1.2 (4) | 1 (28) | 1.4 |

As is apparent from the above, a consistent pattern of improved plant condition resulted when plants were treated with the improved composition described herein before transplanting.

As will now be apparent to those skilled in this art, intermixtures of polyterpene and oxidized emulsifiable polyethylenes of the character described provide improved non-phytotoxic anti-transpirant compositions of significantly improved character. In addition to highly unusual synergistic properties evidenced by the use of certain ranges of proportions of primary constituents therein, the generally improved results attendant a wide range of primary ingredient proportions and the opportunity afforded for selective formulation in accord with desired results over a wide range of expected operating conditions, present a singularly advantageous and useful tool for economically enhancing plant growth and general health.

It will also be apparent that various changes and modifications can be made from the specific details set forth herein without departing from the spirit and scope of the invention.

I claim:

1. A film-forming anti-transpirant coating composition for growing plant foilage in the form of an aqueous emulsion concentrate consisting essentially of the intermixture of oxidized emulsifiable polyethylene having molecular weights in the range of from about 1000 to about 3400 with at least 25% polyterpene having molecular weights in the range of from about 600 to about 1800 and an acid number of about zero.

2. The composition as set forth in claim 1 wherein said polyterpene comprises about 50% or more of said intermixture.

3. The composition as set forth in claim 1 wherein said polyterpene has molecular weights in the range of about 600 to about 800.

4. The composition as set forth in claim 3 wherein said polyterpene comprises about 50% or more of said intermixture.

5. The composition as set forth in claim 1 wherein said polyethylene has molecular weights in the range of about 1400 to about 2100.

6. A film-forming anti-transpirant coating composition for growing plant foilage in the form of an aqueous emulsion concentrate consisting essentially of the intermixture of oxidized emulsifiable polyetheylene having molecular weights in the range of from about 1400 to about 2100 with at least 25% polyterpene having molecular weights in the range of about 600 to about 800 and an acid number of about zero.

7. A composition as set forth in claim 4 wherein said polyterpene comprises about 50% or more of said intermixture.

8. The composition as set forth in claim 1 including an acidity modifying agent and an emulsifier.

9. The composition as set forth in claim 6 including an acidity modifying agent and an emulsifier.

10. A film-forming anti-transpirant coating composition for growing plant foliage concentrate comprising an aqueous emulsion of an intermixture of oxidized emulsifiable polyethylene having molecular weights in the range of from 1400 to about 2100 with about 25% or more polyterpene having molecular weights in the range of about 600 to about 800 and an acid number of about zero in the presence of a small amount of an emulsifier and an acidity modifying agent to enhance the emulsifiability of said oxidized polyethylene.

11. The composition as set forth in claim 10 wherein said polyterpene comprises about 50% or more of said intermixture.

* * * * *